(12) United States Patent
Blind et al.

(10) Patent No.: US 7,688,012 B2
(45) Date of Patent: Mar. 30, 2010

(54) METHOD AND DEVICE FOR DETERMINING THE TORQUE OF AN ELECTRIC MACHINE

(75) Inventors: Stefan Blind, Fellbach (DE); Gunther Goetting, Stuttgart (DE); Martin Eisenhardt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/162,646

(22) PCT Filed: Jan. 30, 2007

(86) PCT No.: PCT/EP2007/050869

§ 371 (c)(1),
(2), (4) Date: Jan. 8, 2009

(87) PCT Pub. No.: WO2007/090760

PCT Pub. Date: Aug. 16, 2007

(65) Prior Publication Data

US 2009/0167222 A1     Jul. 2, 2009

(30) Foreign Application Priority Data

Feb. 9, 2006   (DE) .................. 10 2006 005 854

(51) Int. Cl.
*H02P 7/00*     (2006.01)
(52) U.S. Cl. .................. 318/432; 318/433; 318/434

(58) Field of Classification Search .................. 318/432, 318/433, 434, 798, 801, 700, 724, 716, 722, 318/723, 400.02, 400.01, 400.07, 400.09, 318/400.32, 459
See application file for complete search history.

(56) References Cited

U.S. PATENT DOCUMENTS

| 6,465,975 | B1* | 10/2002 | Naidu .................. 318/430 |
| 6,573,745 | B2 | 6/2003 | Raftari et al. |
| 2003/0155878 | A1* | 8/2003 | Murai .................. 318/268 |
| 2004/0145355 | A1 | 7/2004 | Taniguchi |
| 2004/0217723 | A1* | 11/2004 | Cai et al. .................. 318/268 |
| 2007/0267990 | A1* | 11/2007 | Abolhassani et al. ........ 318/432 |

FOREIGN PATENT DOCUMENTS

DE     10218538     11/2002

OTHER PUBLICATIONS

International Search Report, PCT International Patent Application No. PCT/EP2007/050869, dated Sep. 6, 2007.

* cited by examiner

*Primary Examiner*—Karen Masih
(74) *Attorney, Agent, or Firm*—Kenyon & Kenyon LLP

(57) ABSTRACT

A method for determining the torque of an electric machine, in particular a permanently energized electric machine. The torque is determined by a particularly simple and accurate method by measuring a phase voltage and the rotational speed of the electric machine and calculating the torque based on these values.

10 Claims, 1 Drawing Sheet

METHOD AND DEVICE FOR DETERMINING THE TORQUE OF AN ELECTRIC MACHINE

FIELD OF THE INVENTION

The present invention relates to a method and device for determining the torque of an electric machine, in particular a permanently energized electric machine.

BACKGROUND INFORMATION

Permanently energized synchronous machines are usually used as the electric drive in modern hybrid vehicles. Permanently energized synchronous machines include a rotor in which the magnets generating the magnetic flux are situated as well as a stator having stator windings. The electric machine generates a torque which depends in particular on the phase current and on the magnetic flux in the machine. The generated torque determines the acceleration and/or response characteristic of the vehicle and thus constitutes an important variable that must be determined.

In traditional vehicles, the torque of the electric machine is usually calculated by a mathematical model. Under the assumption that there is no reluctance torque, the following equation applies for torque M:

$$M = K * I_q * \psi,$$

where:

K: machine constant $I_q$: transverse current in the machine (field-oriented regulation)

$\psi$: magnetic flux in the machine.

However, the calculation of torque M is relatively inaccurate because magnetic flux $\psi$ is not constant and in particular varies as a function of temperature. This often results in a relatively high error.

SUMMARY

An object of the present invention is to create a method for determining the torque of an electric machine as well as a corresponding device by which the torque may be determined with significantly greater accuracy.

One aspect of the present invention is to measure a phase voltage and the rotational speed of the electric machine and to use them to calculate the torque. The term "rotational speed" is understood to refer to a proportional variable, e.g., the angular frequency. This has the significant advantage that torque M of the electric machine may be calculated more accurately and temperature influences in particular may be taken into account.

The torque is preferably calculated according to the mathematical model:

$$M = K * I_q * \psi,$$

but magnetic flux $\psi$ is calculated from the measured phase voltage $U_{ind}$ and the rotational speed, i.e., the angular frequency of the electric machine. For magnetic flux $\psi$ the following applies:

$$\psi = U_{ind} / \omega,$$

where:

$U_{ind}$: induced voltage $\omega$: angular frequency.

Phase voltage $U_{ind}$ is preferably measured while electric machine 1 is idling. In this state, all the switches of a pulse-controlled inverter connected to the electric machine are open and the phase voltages have an essentially sinusoidal characteristic. The phase voltage may therefore be measured accurately. The peak value of phase voltage $U_{ind}$ is preferably used for calculation of torque M.

An example device according to the present invention for determining the torque of an electric machine, in particular a permanently energized electric machine, includes a control unit having an algorithm for determining torque M, the control unit receiving a phase voltage signal $U_{ind}$ and a rotational speed signal, and the algorithm calculating torque M based on these variables.

The control unit preferably generates an output signal for triggering a pulse-controlled inverter (PCI) via which the power of the electric machine may be modified in particular.

BRIEF DESCRIPTION OF THE DRAWING

The present invention is explained in greater detail below on the basis of the accompanying FIGURE as an example.

DETAILED DESCRIPTION OF EXAMPLE EMBODIMENTS

Figure 1:
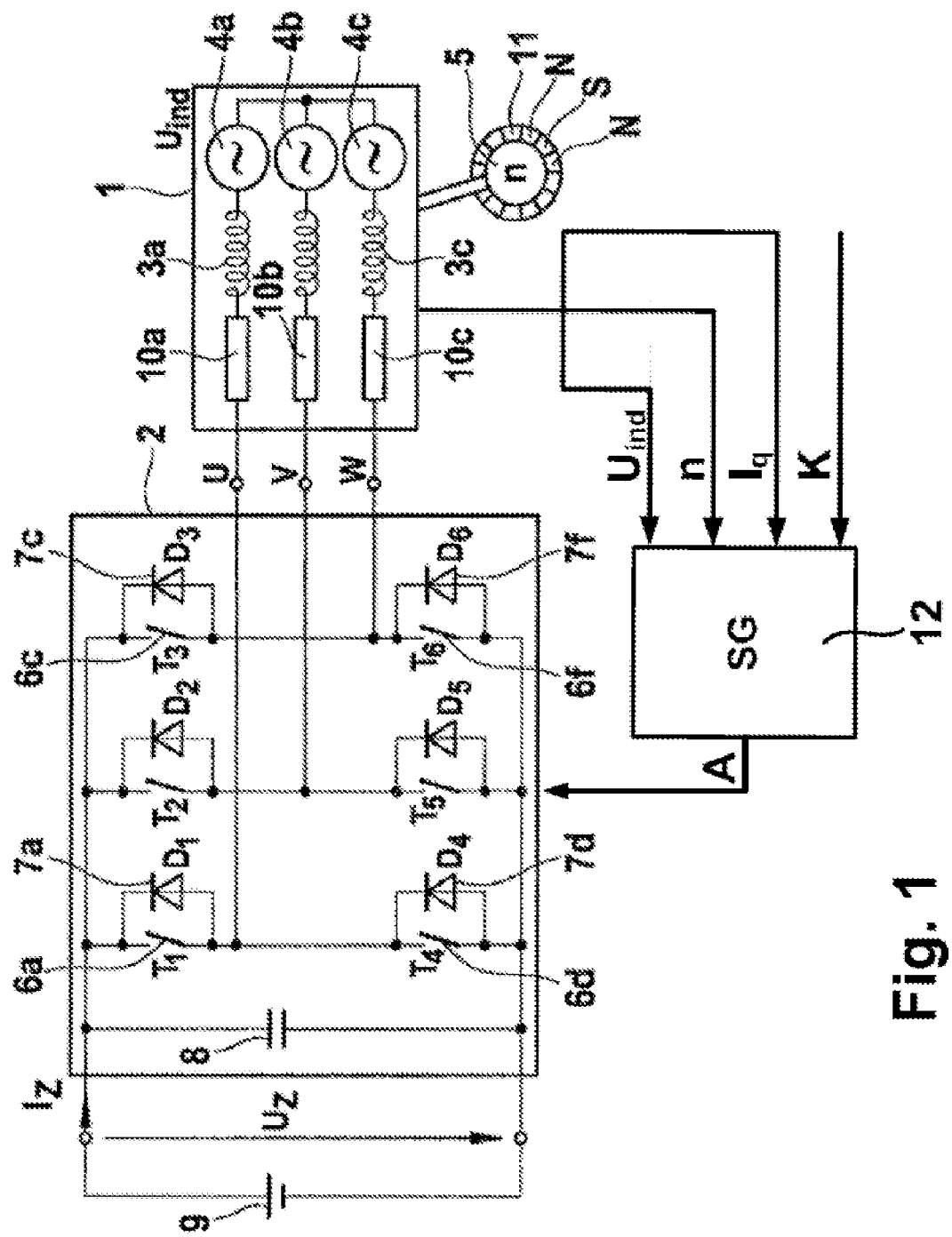
FIG. 1 shows an example of a three-phase electric machine.

FIG. 1 shows a schematic diagram of a three-phase electric machine 1 having a connected pulse-controlled inverter 2. Pulse-controlled inverter (PCI) 2 includes power switches 6a-6f, which are connected to the individual phases U, V, W of electric machine 1 and which switch phases U, V, W either against a high power supply potential (intermediate circuit voltage $U_z$) or a low reference potential (ground). Switches 6a-6c connected to high power supply potential $U_z$ are also referred to as "high-side switches" and switches 6d-6f connected to ground are known as "low-side switches." Pulse-controlled inverter 2 also includes multiple free-wheeling diodes 7a-7f, each in parallel to one of switches 6a-6f.

PCI 2 determines the power and operating mode of electric machine 1 and is triggered by a control unit 12 accordingly. Electric machine 1 may thus be operated optionally in motor operation or in generator operation.

Pulse-controlled inverter 2 also includes a so-called intermediate circuit capacitor 8, which is used generally to stabilize a battery voltage. The vehicle electric system having a battery 9 is connected in parallel to intermediate circuit capacitor 8.

Electric machine 1 is embodied here as a three-phase machine and includes a stator having three line segments 3a-3c and a rotor having multiple permanent magnets 11. The ohmic resistors of line segments 3a-3c are represented by elements 10a-10c.

Electric machine 1 generates a torque M, which depends in particular on phase currents $I_u$, $I_v$/$I_w$ or on transverse current $I_q$ (field-oriented regulation) and magnetic flux $\psi$ prevailing in electric machine 1. Instantaneous torque M of the electric machine is calculated by a mathematical model stored in control unit 12. This model, i.e., algorithm, calculates torque M on the basis of the following equation:

$$M = K * I_q * \psi$$

where magnetic flux $\psi$ is ascertained via the induction law as follows $$U_{ind} = \omega * \psi \text{ and } \psi = U_{ind} / \omega$$

where:

$U_{ind}$: induced voltage in the machine when idling $\omega$: electric angular frequency.

Angular frequency ω of electric machine 1 is measured here by a rotational speed sensor 5. Voltage $U_{ind}$ induced in stator windings 3a-3c is represented schematically by voltage sources 4a-4c and may be measured by a simple voltage sensor. For example, the voltage between two of the phases, e.g., U and V, or the voltage between one of phases U, V, W and one reference potential may be measured as induced voltage $U_{ind}$. This voltage $U_{ind}$ is sinusoidal in idling of electric machine 1 and therefore is preferably measured in this state. (All six power switches 6a-6f of pulse-controlled inverter 2 are open during idling.)

The rotational speed of electric machine 1 should be large enough for the measurement, but on the other hand, it must not exceed a maximum rotational speed above which free-wheeling diodes 7a-7f act as a rectifier bridge. Phase voltages U, V, W would otherwise be distorted and would no longer be sinusoidal.

Voltage and rotational speed signals $U_{ind}$, n are sent to the input of control unit 12. The peak value is calculated from the voltage signal. It corresponds to induced voltage $U_{ind}$ cited above. The algorithm stored in control unit 12 processes these variables and determines from them instantaneous torque M of electric machine 1.

The mathematical model for calculation of torque M may be stored either analytically or as an engine characteristics map in control unit 12. Torque M may be determined particularly accurately and easily in this way.

What is claimed is:

1. A method for determining torque of an electric machine, comprising:
    measuring a phase voltage and rotational speed of the electric machine; and
    calculating the torque from the phase voltage and the rotational speed;
    wherein the torque is calculated based on the following function:
    $M=f(K, I_q, U_{ind}, \omega \text{ or } n)$, wherein M is the torque, K is machine constant, $I_q$ is a transverse current, $U_{ind}$ is induced voltage in the machine when idling, ω is electric angular frequency, and n is rotational speed.

2. The method as recited in claim 1, wherein the electric machine is a permanently energized electric machine.

3. The method as recited in claim 1, wherein the phase voltage is measured when the electric machine is idling.

4. The method as recited in claim 1, wherein a peak value of the phase voltage is ascertained.

5. The method as recited in claim 1, further comprising:
    generating an output signal for triggering a pulse-controlled inverter.

6. A device for determining torque of an electric machine, comprising:
    a control unit adapted to execute an algorithm for determining the torque, which determines the torque of the electric machine from a phase voltage signal and a rotational speed signal, which are supplied to the control unit;
    wherein the algorithm calculates the torque on the basis of a function $M=f(K, I_q, U_{ind}, \omega)$, wherein K is a machine constant, $I_q$ is a transverse current, $U_{ind}$ is a phase voltage, and ω is an electric angular frequency.

7. The device as recited in claim 6, wherein the control unit generates an output signal for triggering a pulse-controlled inverter.

8. The device as recited in claim 6, wherein the electric machine is a permanently energized electric machine.

9. The device as recited in claim 6, wherein the phase voltage is measured when the electric machine is idling.

10. The device as recited in claim 6, wherein a peak value of the phase voltage is ascertained.

\* \* \* \* \*